July 7, 1959  W. J. J. CROOKS  2,894,257
EMERGENCY CAUTION LIGHTS
Filed Dec. 4, 1956  2 Sheets-Sheet 1
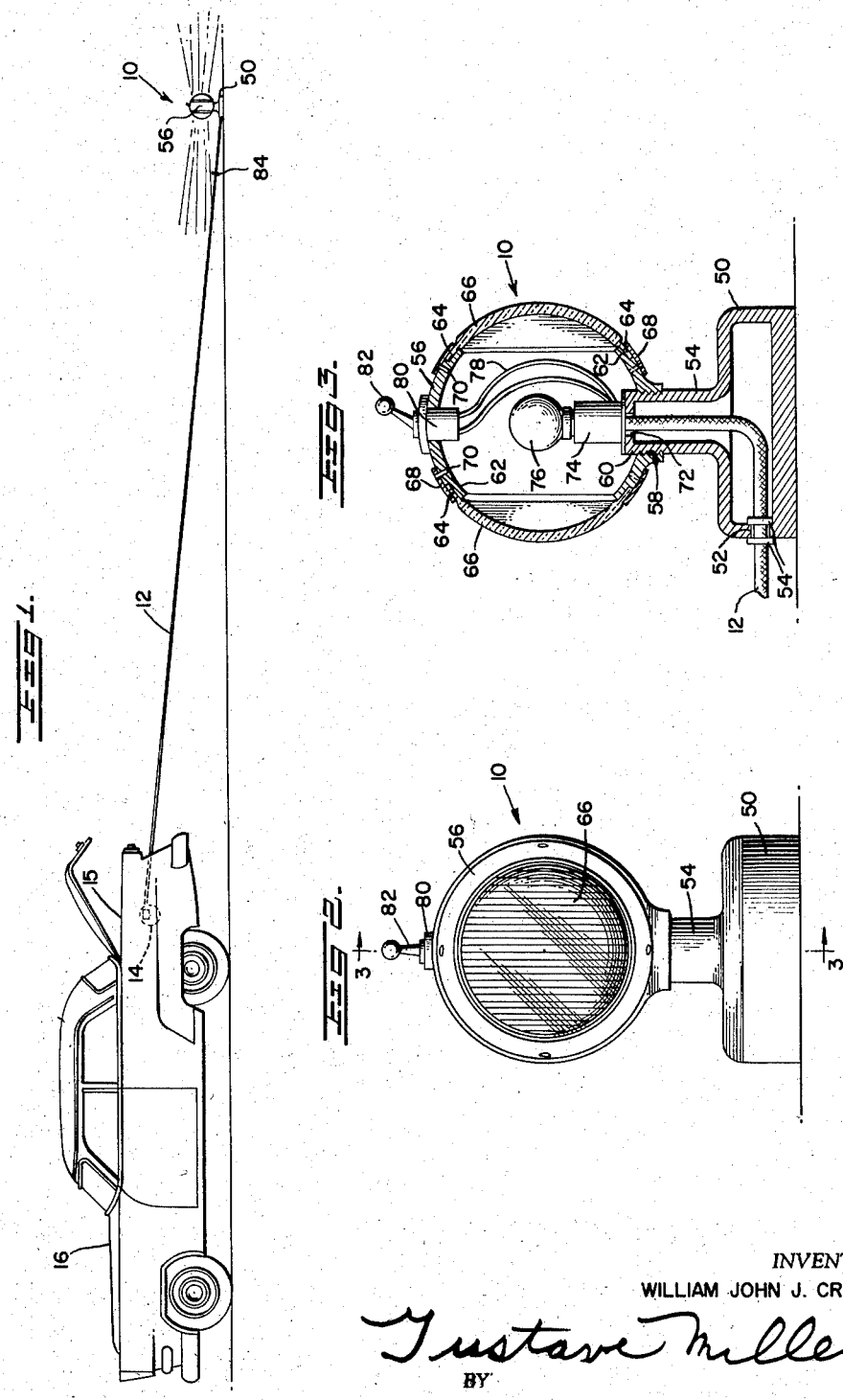
INVENTOR
WILLIAM JOHN J. CROOKS
BY
ATTORNEY July 7, 1959  W. J. J. CROOKS  2,894,257
EMERGENCY CAUTION LIGHTS
Filed Dec. 4, 1956  2 Sheets-Sheet 2
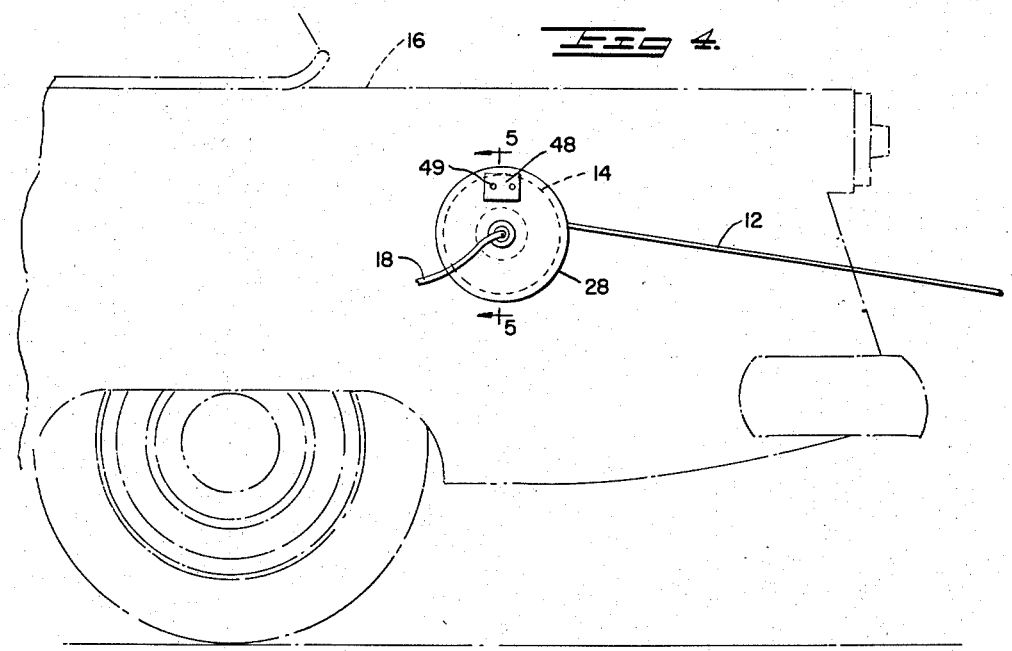
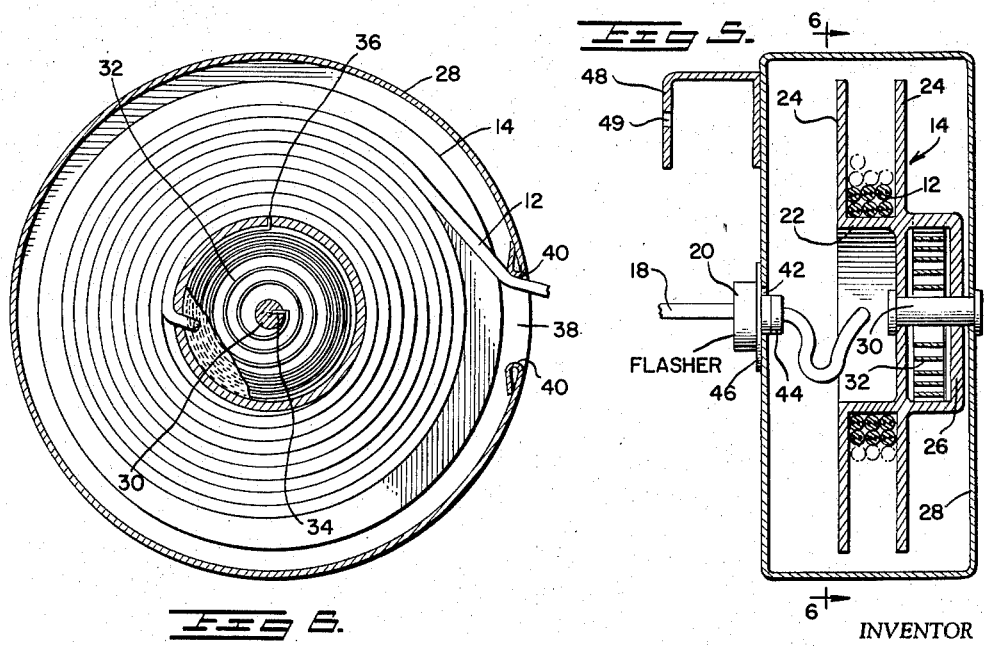
INVENTOR
WILLIAM JOHN J. CROOKS
BY Gustave Miller
ATTORNEY

United States Patent Office 2,894,257
Patented July 7, 1959

2,894,257
EMERGENCY CAUTION LIGHTS
William John J. Crooks, Bronx, N.Y.
Application December 4, 1956, Serial No. 626,170
1 Claim. (Cl. 340—366)

This invention relates to "caution" signal lights, and it particularly relates to electric light devices which are set up adjacent an automobile or the like when such vehicle must be pulled up to the side of the road at night for repairs.

When a vehicle must be pulled to the side of the road at night or in dim light in order to fix a flat tire or effect other repairs, there is always the danger that the drivers of other vehicles coming along the road will not see the parked car in time and will collide therewith or with the person or persons making the repairs. In order to warn oncoming drivers, "flashing" or intermittent lights are often set up to the rear of the parked vehicle. However, such lights are not ordinarily available to the average driver since they are generally expensive, difficult to handle and set up, and require an inordinate amount of storage space. Therefore, although such equipment is sometimes carried by commercial vehicles such as heavy trucks or the like, ordinary passenger cars are not usually so equipped.

It is, therefore, one object of the present invention to provide a "caution" light device which is generally simple in construction, compact for storage, and easily manipulated when needed.

Another object of the present invention is to provide a "caution" light which is adapted to be easily installed as ordinary equipment of the vehicle.

Other objects of the present invention are to provide an improved "caution" device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a side elevational view of a lamp device embodying the present invention, showing it in use in conjunction with an automobile.

Fig. 2 is a front elevational view of the lamp device of Fig. 1.

Fig. 3 is a cross-sectional view taken on line 3—3 of Fig. 2.

Fig. 4 is a side elevational view of the reel assembly.

Fig. 5 is a view taken on line 5—5 of Fig. 4.

Fig. 6 is a view taken on line 6—6 of Fig. 5.

Referring now in greater detail to the drawings wherein similar reference characters refer to similar parts, there is shown a "caution" lamp, generally designated 10, connected by an electric cable 12 to a reel 14 positioned within the trunk compartment 15 of an automobile 16. The cable 12 is not directly attached to the reel 14 but is merely wound around the reel at its intermediate length, the end of the cable, opposite the lamp end, being connected to a source of electrical energy such as the car battery. This "battery" portion of the cable, leading from the reel, is indicated at 18. As shown in Fig. 5, a "flasher" of the ordinary commercial type, indicated generally at 20, is provided on the cable portion 18.

The reel 14 comprises a hub 22 having spaced discs or flanges 24 extending radially therefrom. The space between these flanges provides the pocket for taking up the cable 12. Extending laterally from the hub 22 is a spring casing 26. This casing 26 is connected to a housing 28 by a pin or rivet 30. The housing 28 may be of metal, plastic, or other suitable material. Within the casing is provided with a torsion spring 32, the inner end of which is connected to the pin 30, as at 34, and the outer end of which is connected to the casing, as at 36.

The housing 28 completely encases the reel 14 but is provided with an opening 38 on its periphery through which the cable 12 extends toward the lamp 10. The opening 38 is defined by beads 40 which provide curved, smooth, abutment edges which prevent fraying of the cable 12 as it runs through the opening. At one side of the housing, that which is opposite the pin 30, there is provided a small opening 42 to receive the cable portion 18 leading from the battery. This opening 42 is large enough to hold the bearing 44 for the cable portion 18, but is closed, outwardly of the housing, by a plate 46. The "flasher" unit 20 is positioned adjacent this closure plate 46, as best shown in Fig. 5. The entire housing 28 is attached to one of the interior walls of the automobile trunk by a bracket 48 having holes 49 to receive screws, bolts, rivets, or the like. The housing 28 as well as the reel 14 are preferably constructed of metal but may be made of plastic in order to cut down on its cost.

The lamp 10 comprises a base 50, constructed of metal, wood, or other desirable material which is of sufficient weight to firmly hold the lamp on the ground against the action of both wind and the force of the torsion spring 32. The cable 12 extends through an opening 52 in the side of the base, there being a washer 54 on each side of the opening, and up through a neck 54 on the base. A frame 56, of generally circular configuration, is provided with a threaded sleeve portion 58 at its lower peripheral portion, and this threaded sleeve portion is threadedly engaged with an externally threaded nipple portion 60 at the upper end of the neck 54. The frame 56 is preferably constructed of brass or other metal.

The opposite edges of the frame 56 recessed, as at 62, to receive the reduced edge portions 64 of oppositely-disposed transparent or translucent walls 66 of generally hemispherical shape. Removable clamps 68, held by pins 70, act to clamp the edges 64 of the hemispherical walls 66 in the recesses 62. The wall 66 are preferably colored, one red to face to the rear, and one amber to face to the front.

The cable 12 extends through the base 50, up through the neck 54 and out through an opening 72 in the top of the neck. Positioned on top of the neck is a light bulb socket 74 holding a bulb 76; the cable 12 being electrically connected to the socket. Wires 78 connect the socket to a toggle switch 80 situated at the top of the frame 56. A switch handle 82 is provided on the switch 80 outside the lamp frame 56.

In operation, when the occasion arises, it is merely necessary to open the trunk compartment and pull out the lamp device to the required length. The base 50 is then set on the ground and its weight will ordinarily be sufficient to keep it in place against the bias of the spring 32; however, if necessary, it may be weighted or dug into place. Obviously, a ratchet such as used on window shields may be added to the spring to controllably release the reel for rotation. The switch 80 is then activated and the lamp will flash continuously, red to the rear and amber to the front.

When the work is over, the lamp device is picked up and carried back to the vehicle while the torsion spring 32 acts to rotate the reel 14 to wind up the cable. In fully reeled-up position, a plug 84 on the cable is positioned within the opening 38 in the reel housing to plug up the opening and prevent further reeling in of the cable.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A signal lamp system comprising a housing, a bracket on said housing adapted to be fixedly attached to a support in the trunk of an automobile, a reel rotatably connected to said housing and positioned internally thereof, spring means connected to said reel to rotatably bias said reel in one direction to wind up a cable thereon, a first opening in said housing to permit passage of the cable connected to and leading from a source of electrical energy in the automobile, said cable being wound around said reel and extending out of said housing through a second opening perpendicular to the first opening, said cable being connected to an emergency caution lamp device at that end of said cable which is opposite the end connected to said source of electrical energy, said lamp device having oppositely extending faces, one face indicating "danger," the other face indicating "caution," means to effect an intermittent activation and deactivation of said lamp device, and a stop means on said cable adjacent to but spaced from the lamp device end thereof limiting movement of said cable toward said reel and closing said second opening with said lamp device resting on the automobile trunk floor.

References Cited in the file of this patent

UNITED STATES PATENTS

| | | |
|---|---|---|
| 1,319,012 | Lamb | Oct. 14, 1919 |
| 2,511,893 | Alden | June 20, 1950 |